US012687352B2

(12) United States Patent
Beddadi et al.

(10) Patent No.: US 12,687,352 B2
(45) Date of Patent: Jul. 21, 2026

(54) STONE GUARD

(71) Applicant: VALEO SYSTEMES THERMIQUES,
La Verriere (FR)

(72) Inventors: Youssef Beddadi, San Luis Potosi
(MX); Roy Riski, Auburn Hills, MI
(US); Jesus Leyja, San Luis Potosi
(MX); Catalino Loredo, San Luis
Potosi (MX); Pedro Francisco Valero,
San Luis Potosi (MX); **Ricardo
Sanchez, San Luis Potosi (MX); Bruno
Demory, La Verriere (FR); Mohamed
Alaoui, La Verriere (FR); Dominik
Sporna**, San Mateo, CA (US)

(73) Assignee: Valeo Electrification, Cergy Pontoise
(FR)

( * ) Notice: Subject to any disclaimer, the term of this
patent is extended or adjusted under 35
U.S.C. 154(b) by 318 days.

(21) Appl. No.: 18/449,929

(22) Filed: Aug. 15, 2023

(65) Prior Publication Data

US 2025/0060177 A1 Feb. 20, 2025

(51) Int. Cl.
*F28F 27/00* (2006.01)
*B60K 11/04* (2006.01)
*B60K 11/08* (2006.01)

(52) U.S. Cl.
CPC .............. *F28F 27/00* (2013.01); *B60K 11/04*
(2013.01); *B60K 11/08* (2013.01); *F28F*
*2265/02* (2013.01)

(58) Field of Classification Search
CPC .......... B60K 11/04; B60K 11/08; F28F 27/00;
F28F 2265/02
USPC ................................................. 180/68.1, 68.6
See application file for complete search history.

(56) References Cited

U.S. PATENT DOCUMENTS

| | | | | |
|---|---|---|---|---|
| 1,941,797 | A | * | 1/1934 | Green .................... B60K 11/04 |
| | | | | 165/149 |
| 1,958,995 | A | * | 5/1934 | Green .................... B60R 19/52 |
| | | | | 52/666 |
| 2,089,935 | A | * | 8/1937 | Eyring ................... B60K 11/04 |
| | | | | 29/897.15 |
| 2,184,657 | A | * | 12/1939 | Young .................. F28F 9/0212 |
| | | | | 165/137 |
| 2,542,238 | A | * | 2/1951 | Dreyfuss ................. B60R 19/52 |
| | | | | 428/596 |
| 2,655,092 | A | * | 10/1953 | Spooner ............. B60H 1/00464 |
| | | | | 454/109 |

(Continued)

FOREIGN PATENT DOCUMENTS

| | | |
|---|---|---|
| DE | 4123271 C1 | 6/1992 |
| DE | 102009035170 A1 | 2/2011 |

(Continued)

OTHER PUBLICATIONS

European Patent Office, International Search Report and Written
Opinion of corresponding PCT Application No. PCT/US2024/
041186, dated Dec. 18, 2024.

*Primary Examiner* — Ljiljana V. Ciric
(74) *Attorney, Agent, or Firm* — Valeo Electrification

(57) ABSTRACT

A stone guard including: a guard member configured to
allow a flow of air to pass through the guard member and
block stones from passing through the guard member; and a
first guide member extending from the guard member,
configured to divide the flow of air passing through the
guard member into a first stream of air and a second stream
of air.

20 Claims, 6 Drawing Sheets

(56) References Cited

U.S. PATENT DOCUMENTS

| | | | | |
|---|---|---|---|---|
| 2,854,104 | A * | 9/1958 | Marcy, Jr. | B21D 47/005 |
| | | | | D5/1 |
| 3,660,956 | A * | 5/1972 | Budlong | E04C 2/423 |
| | | | | 52/669 |
| 3,897,850 | A * | 8/1975 | Thompson | B62D 25/10 |
| | | | | 181/204 |
| 3,933,136 | A * | 1/1976 | Burst | E02F 3/968 |
| | | | | 123/41.58 |
| 4,116,265 | A * | 9/1978 | Staebler | F01P 11/12 |
| | | | | 165/95 |
| 4,169,501 | A * | 10/1979 | Takeuchi | B60K 11/04 |
| | | | | 165/126 |
| 4,236,592 | A * | 12/1980 | Ziegler | B60J 1/2005 |
| | | | | 180/68.6 |
| 4,287,961 | A * | 9/1981 | Steiger | B62D 25/10 |
| | | | | 165/137 |
| 4,406,489 | A * | 9/1983 | Trabert | B60K 11/08 |
| | | | | 293/115 |
| 4,454,926 | A * | 6/1984 | Akins | B60K 11/08 |
| | | | | 180/69.24 |
| 4,597,603 | A * | 7/1986 | Trabert | B62D 25/084 |
| | | | | 403/4 |
| 4,604,974 | A * | 8/1986 | Watanabe | B60K 11/08 |
| | | | | 237/12.3 A |
| 4,619,073 | A * | 10/1986 | Janthur | B29C 45/44 |
| | | | | 49/51 |
| 4,753,288 | A * | 6/1988 | Harvey | F01P 7/10 |
| | | | | 123/41.58 |
| 4,916,902 | A * | 4/1990 | Pratt | F28F 27/02 |
| | | | | 60/599 |
| 4,938,303 | A * | 7/1990 | Schaal | B60K 11/02 |
| | | | | 180/68.1 |
| 5,046,554 | A * | 9/1991 | Iwasaki | B60K 11/04 |
| | | | | 165/44 |
| D356,584 | S * | 3/1995 | Innes | D15/31 |
| 5,476,138 | A * | 12/1995 | Iwasaki | F28D 1/0435 |
| | | | | 165/41 |
| 6,230,832 | B1 * | 5/2001 | von Mayenburg | B60K 11/08 |
| | | | | 180/68.1 |
| 6,361,093 | B2 * | 3/2002 | Garberg | B60R 19/52 |
| | | | | 293/115 |
| 6,589,307 | B2 * | 7/2003 | Jaramillo | B01D 46/10 |
| | | | | 55/357 |
| 6,634,448 | B2 * | 10/2003 | Bland | F01P 11/12 |
| | | | | 180/68.1 |
| 6,805,389 | B1 * | 10/2004 | Schellenberg | B60R 19/52 |
| | | | | 293/115 |
| 6,848,524 | B2 * | 2/2005 | Vaillancourt | B62J 17/02 |
| | | | | 123/41.58 |
| 6,854,544 | B2 * | 2/2005 | Vide | E06B 7/084 |
| | | | | 180/68.1 |
| 6,883,589 | B2 * | 4/2005 | Ozawa | B60K 11/04 |
| | | | | 165/41 |
| 6,918,456 | B2 * | 7/2005 | Dennison | B60K 11/08 |
| | | | | 180/68.1 |
| 7,044,848 | B2 * | 5/2006 | Wijaya | B60H 1/00278 |
| | | | | 454/131 |
| 7,073,849 | B1 * | 7/2006 | Nunes | B60R 13/005 |
| | | | | 296/193.09 |
| 7,114,587 | B2 * | 10/2006 | Mori | B62D 29/004 |
| | | | | 296/203.02 |
| 7,255,189 | B2 * | 8/2007 | Kurtz, Jr. | B60K 11/04 |
| | | | | 123/41.43 |
| 7,290,630 | B2 * | 11/2007 | Maeda | F28F 1/128 |
| | | | | 180/69.2 |
| 7,401,672 | B2 * | 7/2008 | Kurtz, Jr. | B60K 11/04 |
| | | | | 180/69.2 |
| 7,422,081 | B2 * | 9/2008 | Dufresne | B62J 23/00 |
| | | | | 180/68.1 |
| 7,451,844 | B2 | 11/2008 | Kunikata | |
| 7,603,968 | B2 * | 10/2009 | Pantow | B60K 11/04 |
| | | | | 123/41.04 |
| 7,690,703 | B2 * | 4/2010 | Maruko | B60R 19/52 |
| | | | | 293/115 |
| 7,726,428 | B2 * | 6/2010 | Kowalski | B62D 25/084 |
| | | | | 180/68.6 |
| 7,766,111 | B2 * | 8/2010 | Guilfoyle | B60K 11/085 |
| | | | | 296/180.5 |
| 7,784,576 | B2 * | 8/2010 | Guilfoyle | B60K 11/085 |
| | | | | 296/180.1 |
| 8,127,878 | B2 * | 3/2012 | Teraguchi | B60K 13/02 |
| | | | | 180/68.1 |
| 8,196,978 | B2 * | 6/2012 | Shin | B62D 25/084 |
| | | | | 293/115 |
| 8,196,998 | B2 * | 6/2012 | Ohno | B60R 19/52 |
| | | | | 293/133 |
| 8,230,910 | B2 * | 7/2012 | Bielesch | F04D 25/06 |
| | | | | 165/122 |
| 8,316,974 | B2 * | 11/2012 | Coel | B60K 11/085 |
| | | | | 165/44 |
| 8,408,344 | B2 | 4/2013 | Williams et al. | |
| 8,474,557 | B2 * | 7/2013 | Wolf | B60T 5/00 |
| | | | | 180/68.1 |
| 8,479,855 | B2 * | 7/2013 | Kim | B60K 11/02 |
| | | | | 62/239 |
| 8,528,679 | B2 * | 9/2013 | Stuckey | B60K 13/02 |
| | | | | 180/68.3 |
| 8,579,358 | B2 | 11/2013 | Meeks et al. | |
| 8,646,552 | B2 * | 2/2014 | Evans | B60R 19/12 |
| | | | | 180/68.1 |
| 8,727,054 | B2 * | 5/2014 | Hori | B60K 11/085 |
| | | | | 165/41 |
| 8,739,744 | B2 * | 6/2014 | Charnesky | B60K 11/085 |
| | | | | 123/41.07 |
| 8,919,300 | B2 * | 12/2014 | Klinkert | B60K 11/08 |
| | | | | 123/41.58 |
| 8,936,121 | B2 * | 1/2015 | Vacca | B60K 11/04 |
| | | | | 165/44 |
| 8,997,907 | B2 * | 4/2015 | Rode | F01P 11/10 |
| | | | | 296/180.2 |
| 9,016,771 | B2 * | 4/2015 | Danev | B62D 25/082 |
| | | | | 296/193.1 |
| 9,046,063 | B2 * | 6/2015 | Landgraf | B60K 13/02 |
| 9,061,585 | B2 * | 6/2015 | Fujiu | B60K 11/08 |
| 9,134,080 | B2 | 9/2015 | Leonard | |
| 9,333,850 | B2 * | 5/2016 | Ruppert | B60K 11/085 |
| 9,365,106 | B2 * | 6/2016 | Brückner | B60K 11/085 |
| 9,446,809 | B2 * | 9/2016 | Sallis | B62J 23/00 |
| 9,669,729 | B2 * | 6/2017 | Ohashi | B60L 15/20 |
| 9,714,602 | B2 * | 7/2017 | Maurer | F01P 11/10 |
| 9,731,592 | B2 * | 8/2017 | Kunimasa | B60K 11/04 |
| 9,840,144 | B2 * | 12/2017 | Aizawa | B60R 19/023 |
| 9,890,688 | B2 * | 2/2018 | Bui | F01P 1/06 |
| 9,926,022 | B1 * | 3/2018 | Golembeski | B60K 11/08 |
| 9,950,610 | B2 * | 4/2018 | Kaneko | B60K 11/04 |
| 9,969,342 | B2 * | 5/2018 | Klop | B60R 19/52 |
| 9,970,720 | B2 * | 5/2018 | Vanberg | F04D 25/166 |
| 9,982,638 | B2 * | 5/2018 | Wadi | F02M 35/10275 |
| 9,994,100 | B1 * | 6/2018 | Del Gaizo | B60K 11/04 |
| 10,029,558 | B2 * | 7/2018 | Frayer, III | B60K 11/085 |
| 10,040,344 | B2 * | 8/2018 | Schöning | B60R 19/48 |
| 10,086,878 | B2 * | 10/2018 | Waco | B62D 25/084 |
| 10,100,707 | B2 * | 10/2018 | Wolf | B60K 11/085 |
| 10,106,211 | B2 * | 10/2018 | Parry-Williams | B60K 11/04 |
| 10,131,303 | B2 * | 11/2018 | Marks | B60R 19/52 |
| 10,131,305 | B2 * | 11/2018 | Marks | B60K 11/08 |
| 10,150,360 | B2 * | 12/2018 | Ohno | E02F 9/0866 |
| 10,293,679 | B2 * | 5/2019 | Dubey | B60K 11/08 |
| 10,343,512 | B2 * | 7/2019 | Tanaka | B60K 11/085 |
| 10,350,990 | B2 * | 7/2019 | Moro | B60K 11/06 |
| 10,363,810 | B2 * | 7/2019 | Blackford | F01P 11/10 |
| 10,391,858 | B2 * | 8/2019 | Jeong | B60K 11/085 |
| 10,407,013 | B1 * | 9/2019 | Hernandez | B60R 19/52 |
| 10,479,193 | B2 * | 11/2019 | Shimizu | B60K 11/04 |
| 10,480,390 | B2 * | 11/2019 | Miyamoto | F04D 19/002 |
| 10,518,631 | B2 * | 12/2019 | Park | B60K 11/085 |
| 10,538,158 | B2 * | 1/2020 | Sedlak | B60Q 5/00 |
| 10,563,925 | B2 * | 2/2020 | Sakaray | F28D 1/06 |
| 10,584,465 | B2 * | 3/2020 | Sakon | B60K 11/02 |

(56) References Cited

U.S. PATENT DOCUMENTS

| 10,625,595 B2 * | 4/2020 | Park | B60K 13/02 |
| 10,683,565 B2 | 6/2020 | Kiss | |
| 10,731,404 B2 * | 8/2020 | Meyerink | E06B 7/096 |
| 10,752,263 B2 * | 8/2020 | Sakurada | B60C 17/00 |
| 10,813,286 B2 * | 10/2020 | Woytera | F01P 11/10 |
| 10,843,551 B2 * | 11/2020 | Iwase | B60K 11/08 |
| 10,875,384 B2 * | 12/2020 | Sato | B60H 1/00028 |
| 10,967,823 B2 * | 4/2021 | Wojdyla | B60K 11/08 |
| 11,014,440 B2 * | 5/2021 | Glickman | B29C 64/106 |
| 11,015,385 B2 * | 5/2021 | Fraser | E06B 7/09 |
| 11,034,292 B2 * | 6/2021 | Glickman | B60R 11/0229 |
| 11,077,747 B2 * | 8/2021 | Ozeki | B62D 25/2018 |
| 11,142,059 B2 * | 10/2021 | Vacca | B62D 25/085 |
| 11,143,089 B2 * | 10/2021 | Wolf | B60K 11/04 |
| 11,255,617 B2 * | 2/2022 | Nguyen | B60K 11/04 |
| 11,279,306 B2 * | 3/2022 | Park | B60K 11/08 |
| 11,602,985 B2 * | 3/2023 | Weston | B60H 1/00042 |
| 11,603,058 B2 * | 3/2023 | Tokuyama | B60R 19/52 |
| 11,772,481 B2 * | 10/2023 | Glickman | B62D 65/10 |
| | | | 180/68.1 |
| 11,807,186 B1 * | 11/2023 | Singh | B60K 11/085 |
| 11,858,334 B2 * | 1/2024 | Ohlhoff | B60K 11/08 |
| 11,951,797 B2 * | 4/2024 | Simofi-Ilyes | B60K 11/02 |
| 12,043,107 B2 * | 7/2024 | Marshall | B60K 13/02 |
| 12,227,142 B2 * | 2/2025 | Singh | B60R 19/52 |
| 12,337,676 B2 * | 6/2025 | Müller | F01P 7/10 |
| 12,365,236 B2 * | 7/2025 | Rode | B60K 11/04 |
| 2002/0096378 A1 * | 7/2002 | Kobayashi | B60K 11/08 |
| | | | 180/68.6 |
| 2003/0000753 A1 * | 1/2003 | Shih | B60R 19/52 |
| | | | 180/68.1 |
| 2004/0104007 A1 * | 6/2004 | Kolb | F02B 29/0456 |
| | | | 165/41 |
| 2006/0060401 A1 * | 3/2006 | Bole | B62D 35/001 |
| | | | 180/68.1 |
| 2010/0139583 A1 * | 6/2010 | Klotz | B60K 11/085 |
| | | | 123/41.04 |
| 2010/0243351 A1 * | 9/2010 | Sakai | F01P 7/10 |
| | | | 296/180.5 |
| 2010/0243352 A1 * | 9/2010 | Watanabe | B60K 11/085 |
| | | | 180/68.1 |
| 2011/0187153 A1 * | 8/2011 | Boutaris | B60K 11/085 |
| | | | 296/193.1 |
| 2011/0204680 A1 * | 8/2011 | Fortin | B62D 25/085 |
| | | | 296/193.1 |
| 2012/0019025 A1 * | 1/2012 | Evans | B62D 35/005 |
| | | | 296/193.1 |
| 2012/0049545 A1 * | 3/2012 | Davis | B60K 11/08 |
| | | | 293/115 |
| 2012/0091757 A1 * | 4/2012 | Tregnago | B60K 11/085 |
| | | | 296/193.1 |
| 2012/0110909 A1 * | 5/2012 | Crane | B29C 48/151 |
| | | | 49/70 |
| 2012/0132474 A1 * | 5/2012 | Charnesky | B60K 11/085 |
| | | | 49/77.1 |
| 2012/0222837 A1 * | 9/2012 | Lanfranco | F28F 19/002 |
| | | | 165/67 |
| 2012/0305818 A1 * | 12/2012 | Charnesky | B60K 11/085 |
| | | | 251/212 |
| 2013/0036991 A1 * | 2/2013 | Kerns | F01P 7/10 |
| | | | 123/41.04 |
| 2013/0092462 A1 * | 4/2013 | Chinta | B60K 11/08 |
| | | | 180/68.1 |
| 2014/0132033 A1 * | 5/2014 | Townson | B62D 27/06 |
| | | | 296/193.1 |
| 2015/0028605 A1 * | 1/2015 | Maier | B60R 19/52 |
| | | | 293/115 |
| 2015/0118949 A1 * | 4/2015 | Nam | F01P 1/06 |
| | | | 454/155 |
| 2017/0008388 A1 * | 1/2017 | Walters | C25D 7/00 |
| 2017/0021720 A1 * | 1/2017 | Anderson | B60K 11/085 |
| 2019/0128171 A1 * | 5/2019 | Kurimoto | B60H 1/00571 |
| 2024/0218823 A1 * | 7/2024 | Mammeri | F01P 11/10 |
| 2024/0399855 A1 * | 12/2024 | Ghelfi | B60K 11/04 |
| 2025/0060177 A1 * | 2/2025 | Beddadi | F28F 27/00 |
| 2025/0128780 A1 * | 4/2025 | Sakai | B62J 41/00 |

FOREIGN PATENT DOCUMENTS

| DE | 102012209980 A1 * | 12/2012 | | B60T 5/00 |
| EP | 2495521 A1 | 9/2012 | | |
| EP | 3591328 A1 | 1/2020 | | |
| FR | 2478551 A1 | 9/1981 | | |
| FR | 2478806 A1 | 9/1981 | | |
| FR | 3076496 A1 | 7/2019 | | |
| FR | 3104693 A1 | 12/2019 | | |
| JP | H07189695 A | 7/1995 | | |
| WO | 2018007722 A1 | 1/2018 | | |

* cited by examiner

STONE GUARD

TECHNICAL FIELD

The present invention relates to a stone guard, particularly to a stone guard for a heat exchanger module.

BACKGROUND OF THE INVENTION

Generally, a vehicle comprises a heat exchanger module configured to exchange heat with air. The heat exchanger module is preferably arranged in a front end of the vehicle in the flow of air. The heat exchanger module comprises at least one heat exchanger. In one example, the heat exchanger module comprises a first heat exchanger and a second heat exchanger stacked together to save space. In another example, the first heat exchanger and the second heat exchanger are stacked together in an inclined manner to save more space. When the air flows through the heat exchanger module arranged in the inclined manner, the air flows through a space between the first heat exchanger and the second heat exchanger in a first direction different from a second direction in which the air flows across the first heat exchanger and the second heat exchanger. Consequently, non-uniform heat exchange occurs in the heat exchanger module and heat exchange performance of the heat exchanger module is reduced.

SUMMARY OF THE INVENTION

An objective of the present invention is to provide a stone guard for a heat exchanger module that alleviates the problems in the prior arts. To be more precise, an objective of the present invention is to provide a stone guard that guides the airflow between inlet and outlet of an inclined cooling module so that the airflow is pushed through all required areas of the heat exchangers. In a particular case of the first, upstream heat exchanger being shorter than the second, downstream heat exchanger, the airflow can enter the area below the first heat exchanger and go in-between the first and second heat exchangers upwards, while at least partly omitting the bottom part of the second heat exchanger. The invention solves the problem by blocking said unintended flow and guiding part of the air stream towards the bottom of the second heat exchanger, thereby improving overall heat exchange efficiency.

Another objective of the present invention is to provide a stone guard that guides the flow of air to an entire portion of the second heat exchanger.

To achieve the above objectives, an embodiment of the present invention herein provides a stone guard. The stone guard comprising: a guard member configured to allow air to pass through the guard member and block stones from passing through the guard member; and a first guide member extending from the guard member, configured to divide the flow of air passing through the guard member into a first stream of air and a second stream of air.

In one aspect, the guard member comprises a plurality of openings to allow air to pass through the guard member.

In another aspect, the guard member comprises a flat quadrilateral shape with an upper end, a lower end, a first lateral end and a second lateral end.

In yet another aspect, the first guide member extends from the guard member at an oblique angle with the flat shape of the guard member.

In yet another aspect, the first guide member extends from the guard member at a right angle with the flat shape of the guard member.

In yet another aspect, the first guide member runs from the first lateral end to the second lateral end of the guard member.

In yet another aspect, the first guide member is located nearer to the lower end of the guard member than the upper end of the guard member.

In yet another aspect, the stone guard comprises at least one support member configured to support the first guide member with respect to the guard member.

In yet another aspect, the stone guard comprises a second guide member extending from the guard member, configured to divide the second stream of air into a third stream of air and a fourth stream of air.

In another embodiment, the present invention herein provides an inclined heat exchanger module. The inclined heat exchanger module comprises: a first heat exchanger configured to exchange heat with air; a second heat exchanger configured to exchange heat with air, arranged downstream of the first heat exchanger in the flow of air, wherein height of the second heat exchanger is greater than that of the first heat exchanger; and a stone guard arranged upstream of the first heat exchanger in the flow of air, comprises a guard member configured to allow air to pass through the guard member and block stones from passing through the guard member, wherein the guard member at least partially covers the first heat exchanger and the second heat exchanger when viewed in a direction of the flow of air; and a first guide member extending from the guard member, configured to divide the flow of air passing through the guard member into a first stream of air and a second stream of air, wherein the first guide member extends adjacent a first lower end of the first heat exchanger and reaches the second heat exchanger.

In another aspect, the guard member comprises a plurality of openings to allow air to pass through the guard member.

In yet another aspect, the guard member comprises a flat shape.

In yet another aspect, the first guide member extends from the guard member at an oblique angle with the flat shape of the guard member.

In yet another aspect, the first guide member extends from the guard member at a right angle with the flat shape of the guard member.

In yet another aspect, the first guide member is adapted to guide the first stream of air towards the first heat exchanger and a first portion of the second heat exchanger, and the second stream of air towards a second portion of the second heat exchanger.

In yet another aspect, a side of the first guide member is in contact with the first lower end of the first heat exchanger.

In yet another aspect, a free end of the first guide member is located nearer to an upstream face of the second heat exchanger.

In yet another aspect, the stone guard is connected to the first heat exchanger.

In yet another aspect, the stone guard is connected to a primary-first collector and a secondary-first collector of the first heat exchanger.

In yet another aspect, the second heat exchanger is connected to the first heat exchanger.

In yet another aspect, the first heat exchanger is a radiator and the second heat exchanger is a condenser.

In yet another aspect, an inclined heat exchanger module comprises: a first heat exchanger configured to exchange heat with a flow of air; a second heat exchanger configured to exchange heat with the flow of air, arranged downstream of the first heat exchanger; a stone guard including: a guard member configured to allow the flow of air to pass through the guard member and block stones from passing through the guard member; and a first guide member extending from the guard member, configured to divide the flow of air passing through the guard member into a first stream of air and a second stream of air; wherein the stone guard is arranged upstream of the first heat exchanger, wherein the first heat exchanger, the second heat exchanger and the stone guard are stacked together and extend along a height axis so that they are each defined by a respective height dimension, and along a depth axis so that they are each defined by a respective depth dimension, wherein a portion of the second heat exchanger extends beyond the first heat exchanger so that the flow of air is enabled to reach the second heat exchanger without flowing through the first heat exchanger, wherein the guard member at least partially covers the first heat exchanger and partially covers the second heat exchanger when viewed in a direction of the flow of air, with the first guide member extending along the depth axis adjacent to the first heat exchanger so that the first stream is directed through the first heat exchanger and the second stream is directed through the second heat exchanger.

In yet another aspect, the first stream is enabled to flow through a portion of the second heat exchanger covered by the first heat exchanger, while the second stream is enabled to flow through a portion of the second heat exchanger not covered by the first heat exchanger.

In yet another aspect, the height axis is non-parallel with respect to the flow of the air.

In yet another aspect, the depth axis is parallel with respect to the flow of the air.

In yet another aspect, the height dimension of the second heat exchanger is greater than the height dimension of the first heat exchanger.

In yet another aspect, the first guide member is attached to the adjacent portion of the first heat exchanger, extending along the depth axis.

In yet another aspect, the stone guard includes at least one support member configured to support the first guide member with respect to the guard member, with the at least one support member being arranged on the side of the first guide member dedicated to the first stream.

In yet another aspect, the inclined heat exchanger module further comprises an air duct with an air inlet and an air outlet for the flow of the air, with the first heat exchanger, the second heat exchanger and the stone guard being arranged within the air duct so the flow of the air is enabled to enter the air duct through the air inlet, flow through the stone guard, the first heat exchanger, the second heat exchanger, and exit through the air outlet.

According to the above embodiments, the first guide member of the stone guard extends adjacent the first lower end of the first heat exchanger and reaches the second heat exchanger. Therefore, the first guide member of the stone guard significantly blocks the space between the first heat exchanger and the second heat exchanger, and guides the flow of air to the entire portion of the second heat exchanger.

BRIEF DESCRIPTION OF DRAWINGS

Other characteristics, details and advantages of the invention can be inferred from the description of the invention hereunder. A more complete appreciation of the invention and many of the attendant advantages thereof will be readily obtained, as the same becomes better understood by reference to the following description when considered in connection with the accompanying figures, wherein.

DETAILED DESCRIPTION OF THE INVENTION

It must be noted that the figures disclose the invention in a detailed enough way to be implemented, the figures helping to better define the invention, if need be. The invention should however not be limited to the embodiments disclosed in the description.

In the present description, some elements or parameters may be indexed, such as a first element and a second element. In this case, unless stated otherwise, this indexation is only meant to differentiate and name elements that are similar but not identical. No idea of priority should be inferred from such indexation, as these may be switched without betraying the invention. Additionally, this indexation does not imply any order in mounting or use of the elements of the invention.

Figure 1:
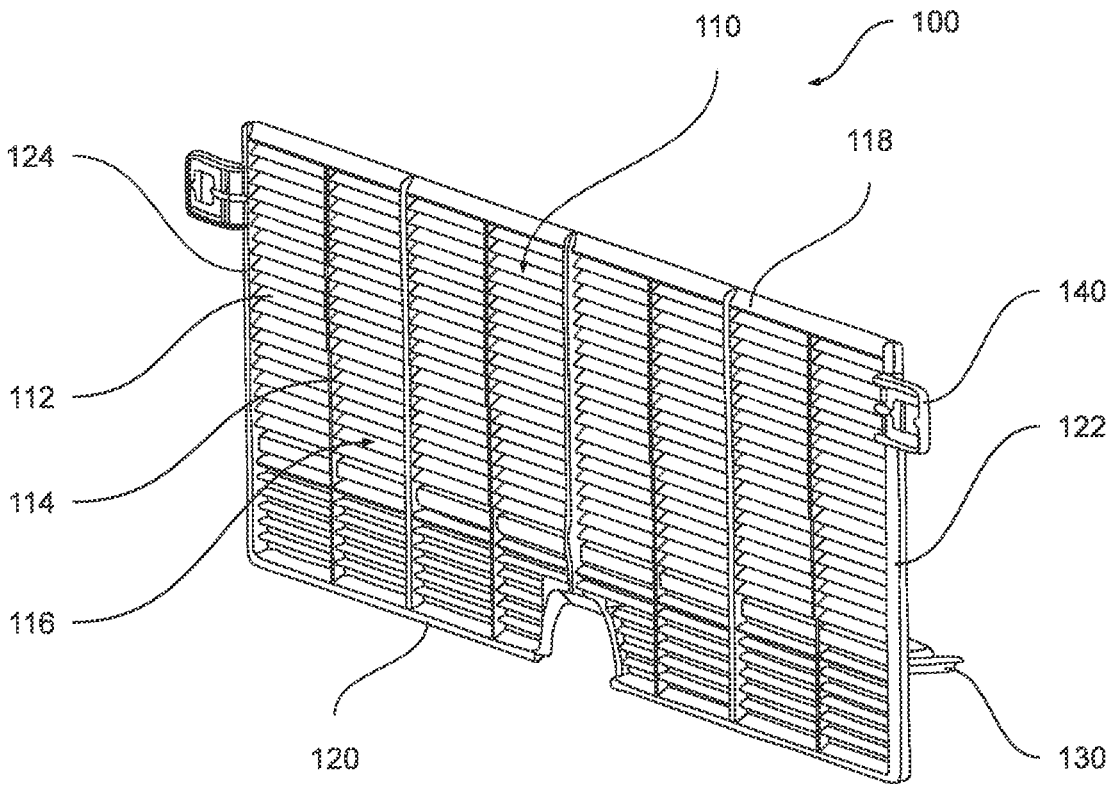
FIG. 1 illustrates a perspective view of a stone guard, in accordance with an embodiment of the present invention.
Figure 2:
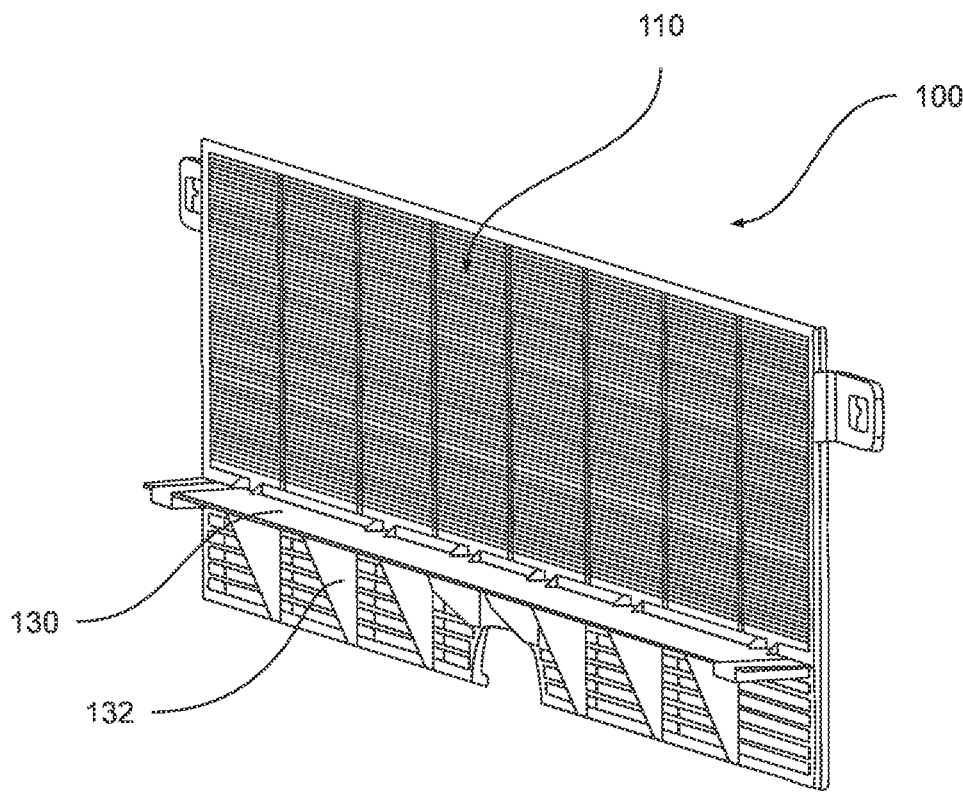
FIG. 2 illustrates another perspective view of the stone guard of FIG. 1.

FIG. 1 and FIG. 2 illustrate different perspective views of a stone guard 100, in accordance with an embodiment of the present invention. The stone guard 100 comprises a guard member 110 and at least one guide member. In one embodiment, the stone guard 100 can comprise a guard member 110 configured to allow air to pass through the guard member 110 and block stones from passing through the guard member 110. The stone guard 100 can comprise a first guide member 130 extending from the guard member 110 and configured to divide the flow of air A passing through the guard member 110 into a first stream A1 of air and a second stream A2 of air. The guard member 110 effectively seals the space between bottom of the first heat exchanger 300 and the downstream second heat exchanger 400 and guides the air along it to ensure the bottom of the second heat exchanger 400 has air flowing though it.

In one aspect, the guard member 110 can comprise a plurality of openings 116 configured to allow air to pass through the guard member 110. In one example, the guard member 110 can be a sheet with the plurality of openings 116. In another example, the guard member 110 can be a mesh with the plurality of openings 116. The guard member 110 can comprise a plurality of first members 112 and a plurality of second members 114 connected to the plurality of first members 112, wherein the plurality of first members 112 together with the plurality of second members 114 form the plurality of openings 116. In yet another example, the plurality of first members 112 can be arranged parallel to each other, and the plurality of second members 114 can be arranged parallel to each other. The plurality of second members 114 can be connected to the plurality of first members 112 at an oblique angle to form the plurality of openings 116. In yet another example, the plurality of second members 114 can be connected to the plurality of first members 112 at a right angle to form the plurality of openings 116.

The first members 112 can be vanes of generally flat cross-section, with the plurality of openings 116 being effectively empty spaces between the first members 112.

In another aspect, the guard member 110 can comprise any shape, such as but not limited to a flat polygon shape. In yet another example, the guard member 110 can comprise a flat quadrilateral shape with an upper end 118, a lower end 120, a first lateral end 122 and a second lateral end 124. In yet another aspect, the first guide member 130 can extend from the guard member 110 at an angle with the flat shape of the guard member 110. In yet another example, the first guide member 130 can extend from the guard member 110 at an oblique angle with the flat shape of the guard member 110. In yet another example, the first guide member 130 can extend from the guard member 110 at a right angle with the flat shape of the guard member 110. The reference to the flat shape can be understood as to the general plane of extension of the guard member 130. In one example, the reference to the flat shape can be understood as to the general plane of an air inlet formed by the plurality of the openings 116 of the guard member 130.

In another aspect, the first guide member 130 can run from a first end to a second end of the guard member 110. The first end of the guard member 110 can be opposite to the second end of the guard member 110. In yet another aspect, the first guide member 130 can be located nearer to a third end of the guard member 110 compared to a fourth end of the guard member 110. The third end of the guard member 110 can be opposite to the fourth end of the guard member 110, wherein the first end, the second end, the third end and the fourth end of the guard member 110 can be four ends of the guard member 110. In yet another example, the first guide member 130 can run from the first lateral end 122 to the second lateral end 124 of the guard member 110. The first guide member 130 can be located nearer to the lower end 120 of the guard member 110 than the upper end 118 of the guard member 110. In yet another example, the first guide member 130 can be located nearer to the upper end 118 of the guard member 110 than the lower end 120 of the guard member 110. In yet another example, the first guide member 130 can run from the upper end 118 to the lower end 120 of the guard member 110. The first guide member 130 can be located nearer to the first lateral end 122 of the guard member 110 than the second lateral end 124 of the guard member 110. In yet another example, the first guide member 130 can be located nearer to the second lateral end 124 of the guard member 110 than the first lateral end 122 of the guard member 110.

In another aspect, the first guide member 130 can be located halfway between the third end and the fourth end of the guard member 110. In yet another aspect, the first guide member 130 can have any shape, such as but not limited to a flat shape. In yet another aspect, the first guide member 130 can comprise at least one member extending from the guard member 110. In yet another example, the first guide member 130 can comprise a single member extending from the guard member 110. In yet another example, the first guide member 130 can comprise a plurality of members extending from the guard member 110, wherein a gap between any two adjacent members from the plurality of members is negligible.

In another aspect, the stone guard 100 can comprise at least one support member 132 configured to support the first guide member 130 with respect to the guard member 110. In yet another example, the stone guard 100 can comprise a plurality of support members 132 configured to support the first guide member 130 with respect to the guard member 110. In yet another aspect, the at least one support member 132, at one end, can be connected to the guard member 110 and at yet another end, can be connected to the first guide member 130. In yet another example, the at least one support member 132 can comprise a triangle shape, wherein the at least one support member 132, at a first end, can be connected to the guard member 110 and at a second end adjacent to the first end, can be connected to the first guide member 130.

In another aspect, the stone guard 100 can comprise a fastening means 140 adapted to connect the stone guard 100 to yet another part. In yet another aspect, the fastening means 140 can be provided at the first end and the second end of the guard member 110. In yet another example, the fastening means 140 can be provided at the first lateral end 122 and the second lateral end 124 of the guard member 110. In yet another example, the fastening means 140 can be provided at the upper end 118 and the lower end 120 of the guard member 110. The fastening means 140 can be any type of fastening means, such as but not limited to clip, bracket, slot or orifice.

In another embodiment, the stone guard 100 can comprise a second guide member extending from the guard member 110, in addition to the first guide member 130. In yet another aspect, the second guide member can be configured to divide any one of the first stream A1 of air or the second stream A2 of air passing through the guard member 110 into a third stream of air and a fourth stream of air. In yet another example, the second guide member can be configured to divide the second stream A2 of air passing through the guard member 110 into the third stream of air and the fourth stream of air. In yet another aspect, the first guide member 130 and the second guide member can be located at a first distance and a second distance from the third end of the guard member 110 respectively, wherein the first distance is greater than the second distance. In yet another example, the first guide member 130 and the second guide member can be located at a first distance and a second distance from the lower end 120 of the guard member 110, wherein the first distance is greater than the second distance. In other words, the second guide member can be located between the first guide member 130 and the lower end 120 of the guard member 110. In yet another aspect, the first guide member 130 and the second guide member can have a first height and a second height measured from their respective base ends connected with the guard member 110 to their respective free ends, wherein the second height is greater than the first height. In other words, height of the second guide member can be greater than that of the first guide member 130.

In one embodiment, the first elements 112 arranged on one side of the first guide member 130, e.g. those to be located within and pass through the first stream of air A1, are arranged at a different angle with respect to the general plane of the stone guard 100 and/or ground 800 than the first elements 112 arranged on the other side of the first guide member 130, e.g. those to be located within and pass through the second stream of air A2. Thanks to such configuration, the respective first and second streams of air A1, A2 can be directed individually to better address cooling needs and airflow specifics of the inclined heat exchanger module 200.

Figure 3:
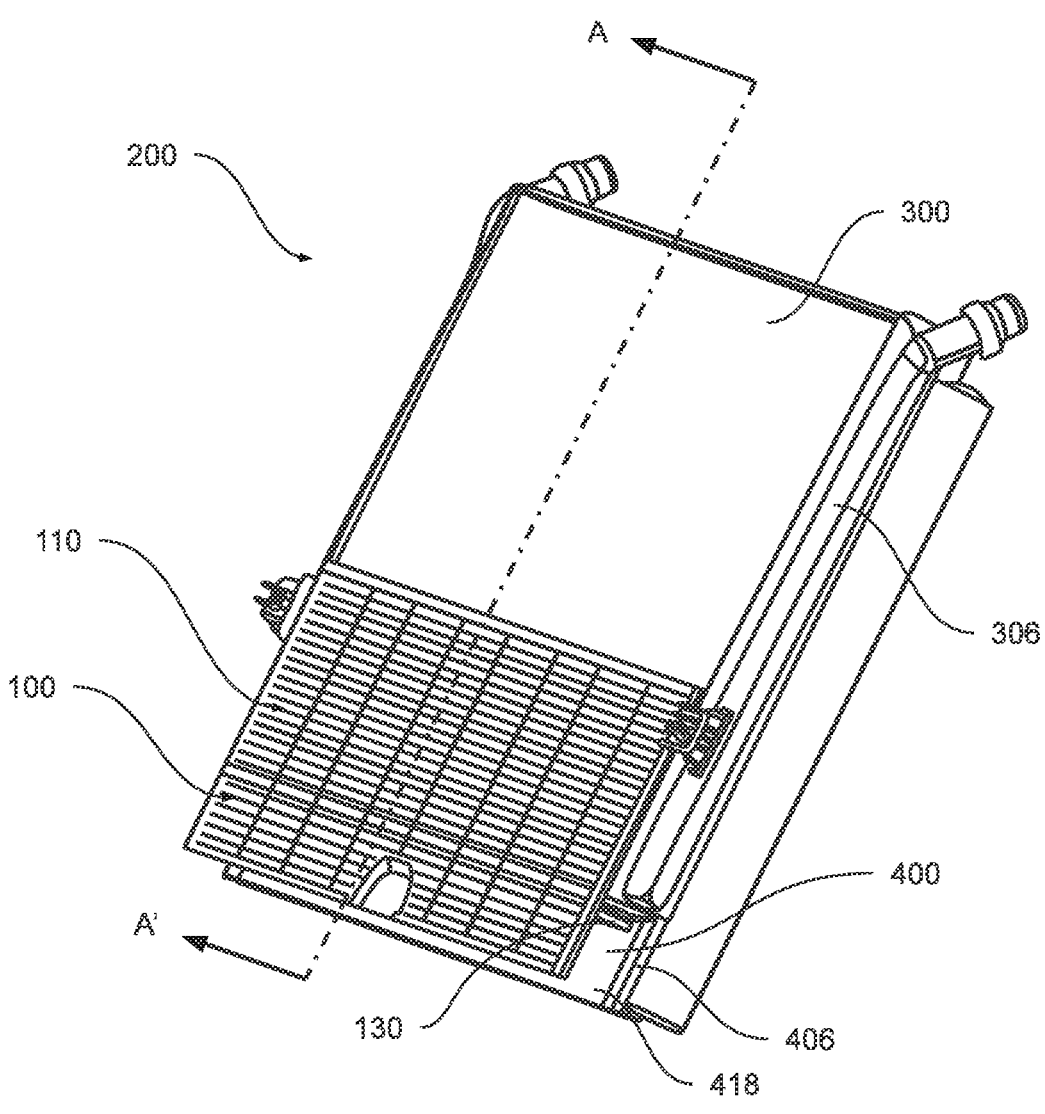
FIG. 3 illustrates a perspective view of an inclined heat exchanger module comprising the stone guard of FIG. 1, in accordance with another embodiment of the present invention.
Figure 4:
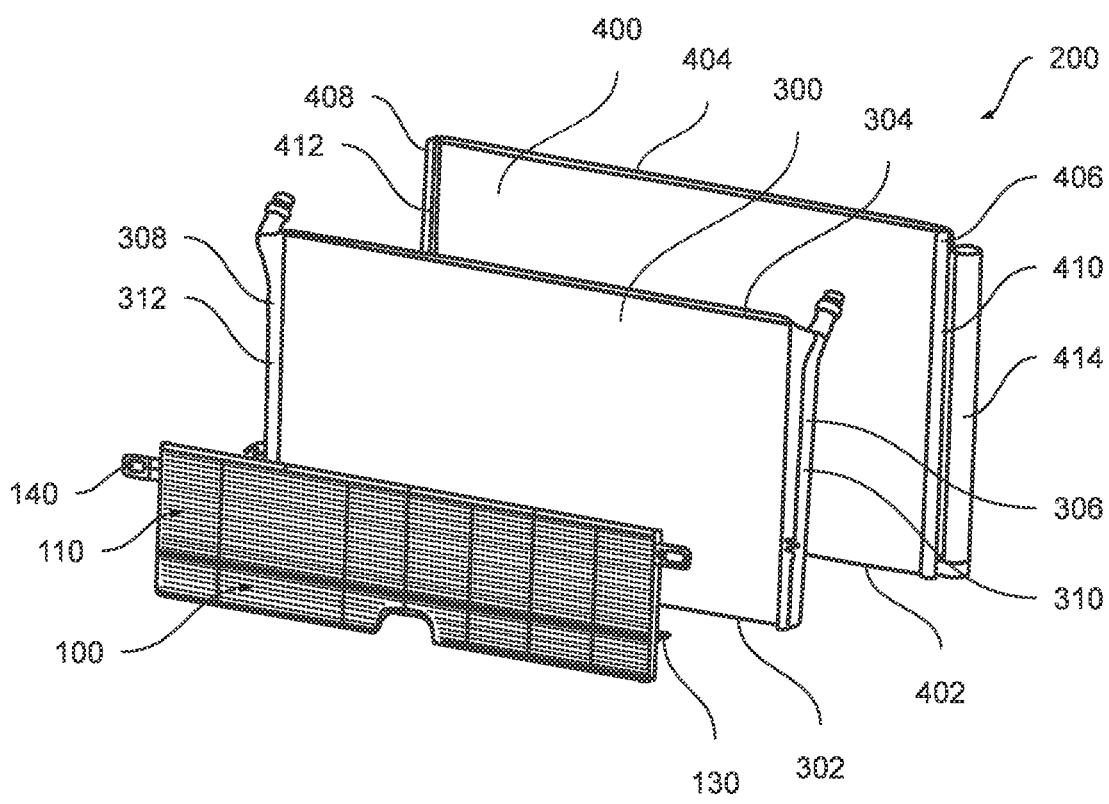
FIG. 4 illustrates an exploded view of the inclined heat exchanger module of FIG. 3.
Figure 5:
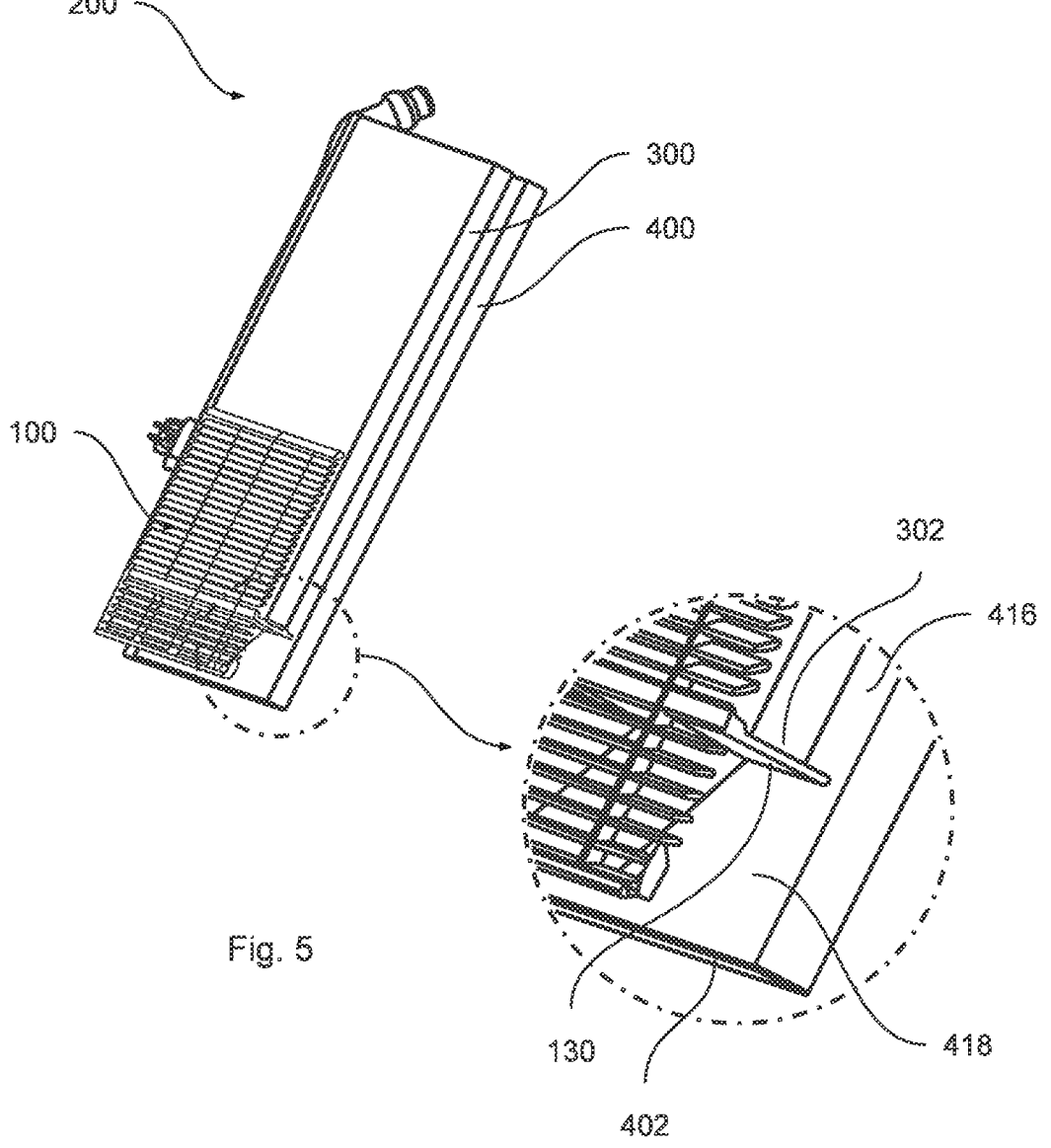
FIG. 5 illustrates a sectional view of the inclined heat exchanger module of FIG. 3, at the plane A-A'.

FIG. 3 illustrates a perspective view of an inclined heat exchanger module 200 comprising the stone guard 100 of FIG. 1, in accordance with yet another embodiment of the present invention. FIG. 4 illustrates an exploded view of the inclined heat exchanger module 200 of FIG. 3. FIG. 5 illustrates a sectional view of the inclined heat exchanger module 200 of FIG. 3, at the plane A-A'. The inclined heat exchanger module 200 comprises at least two heat exchangers and the stone guard 100. In yet another embodiment, the inclined heat exchanger module 200 can comprise a first heat exchanger 300 configured to exchange heat with air. The inclined heat exchanger module 200 can comprise a second heat exchanger 400 configured to exchange heat with air and arranged downstream of the first heat exchanger 300 in the flow of air A, wherein height of the second heat exchanger 400 is greater than that of the first heat exchanger 300. The inclined heat exchanger module 200 can comprise the stone guard 100 arranged upstream of the first heat exchanger 300 in the flow of air A, wherein the stone guard 100 comprises the guard member 110 and the first guide member 130. The guard member 130 of the stone guard 100 can at least partially cover the first heat exchanger 300 and the second heat exchanger 400 when viewed in a direction of the flow of air A. The first guide member 130 of the stone guard 100 can extend adjacent a first lower end 302 of the first heat exchanger 300 and reach the second heat exchanger 400.

In another aspect, the first heat exchanger 300 and the second heat exchanger 400 can be arranged parallel to each other, in an inclined manner in the flow of air A. In yet another aspect, the first lower end 302 of the first heat exchanger 300 can be located higher than a second lower end 402 of the second heat exchanger 400 when viewed in the direction of the flow of air A. In yet another aspect, a first upper end 304 of the first heat exchanger 300 can be located lower than or at the same height as a second upper end 404 of the second heat exchanger 400 when viewed in the direction of the flow of air A. In yet another example, the first lower end 302 of the first heat exchanger 300 can be located higher than the second lower end 402 of the second heat exchanger 400 and the first upper end 304 of the first heat exchanger 300 can be located at the same height as the second upper end 404 of the second heat exchanger 400, wherein the height of the second heat exchanger 400 is greater than that of the first heat exchanger 300.

In another aspect, the second heat exchanger 400 can be adapted to connect to the first heat exchanger 300. In yet another aspect, two sides of the second heat exchanger 400 can be adapted to connect to the first heat exchanger 300. In yet another example, a primary-second lateral side 406 and a secondary-second lateral side 408 of the second heat exchanger 400 can be adapted to connect to the first heat exchanger 300. The primary-second lateral side 406 and the secondary-second lateral side 408 of the second heat exchanger 400 can be adapted to connect to a primary-first lateral side 306 and a secondary-first lateral side 308 of the first heat exchanger 300 respectively. In yet another example, the primary-second lateral side 406 and the secondary-second lateral side 408 of the second heat exchanger 400 can be adapted to connect to a primary-first collector 310 and a secondary-first collector 312 of the first heat exchanger 300 respectively. In yet another example, a primary-second collector 410 and a secondary-second collector 412 of the second heat exchanger 400 can be adapted to connect to the primary-first collector 310 and the secondary-first collector 312 of the first heat exchanger 300 respectively.

In another aspect, the first heat exchanger 300 can be a radiator. In yet another aspect, the second heat exchanger 400 can be a condenser with a receiver dryer 414. In yet another example, the receiver dryer 414 can be in fluid communication with the primary-second collector 410 of the second heat exchanger 400 and located at the primary-second lateral side 406 of the second heat exchanger 400. The receiver dryer 414 can be adapted to connect to primary-first collector 310 of the first heat exchanger 300. In yet another example, the receiver dryer 414 can be in fluid communication with the secondary-second collector 412 of the second heat exchanger 400 and located at the secondary-second lateral side 408 of the second heat exchanger 400. The receiver dryer 414 can be adapted to connect to secondary-first collector 312 of the first heat exchanger 300.

In another aspect, the guard member 110 of the stone guard 100 can at least partially cover the first heat exchanger 300 and the second heat exchanger 400 when viewed in the direction of the flow of air A, wherein the guard member 110 of the stone guard 100 can allow the flow of air A to reach the first heat exchanger 300 and the second heat exchanger 400 and can block stones from hitting the first heat exchanger 300 and the second heat exchanger 400. In yet another example, the guard member 110 of the stone guard 100 can partially cover the first heat exchanger 300 and the second heat exchanger 400. In yet another example, the guard member 110 of the stone guard 100 can fully cover the first heat exchanger 300 and the second heat exchanger 400.

In another aspect, the first guide member 130 of the stone guard 100 can significantly block the space between the first heat exchanger 300 and the second heat exchanger 400. In yet another example, one side of the first guide member 130 can be in contact with the first lower end 302 of the first heat exchanger 300. A free end of the first guide member 130 can be located nearer to an upstream face of the second heat exchanger 400, wherein gap between the free end of the first guide member 130 and the upstream face of the second heat exchanger 400 is negligible.

In another aspect, the first guide member 130 of the stone guard 100 can be configured to divide the flow of air A passing through the guard member 110 of the stone guard 100 into the first stream A1 of air and the second stream A2 of air, and guide the first stream A1 of air and the second stream A2 of air towards the first heat exchanger 300 and the second heat exchanger 400. In yet another example, one side of the first guide member 130 can be adapted to guide the first stream A1 of air towards the first heat exchanger 300 and a first portion of the second heat exchanger 400, and yet another side of the first guide member 130 can be adapted to guide the second stream A2 of air towards a second portion of the second heat exchanger 400. The first portion of the second heat exchanger 400 can be a portion of the second heat exchanger 400 located above the first guide member 130 when viewed in the direction of the flow of air A, and the second portion of the second heat exchanger 400 can be yet another portion of the second heat exchanger 400 located below the first guide member 130 when viewed in the direction of the flow of air A. In yet another example, the second portion of the second heat exchanger 400 can be a sub-cooling portion of the second heat exchanger 400, wherein the second heat exchanger 400 is the condenser.

In another aspect, the stone guard 100 can be adapted to connect to the first heat exchanger 300. In yet another example, the fastening means 140 of the stone guard 100 can be adapted to connect to the primary-first lateral side 306 and the secondary-first lateral side 308 of the first heat exchanger 300 respectively. In yet another example, the fastening means 140 of the stone guard 100 can be adapted to connect to the primary-first collector 310 and the secondary-first collector 312 of the first heat exchanger 300 respectively.

In another embodiment, the inclined heat exchanger module 200 can comprise a third heat exchanger configured to exchange heat with air, in addition to the first heat exchanger 300 and the second heat exchanger 400. The third heat exchanger can be arranged downstream of the second heat exchanger 400 in the flow of air A, wherein height of the third heat exchanger can be greater than the second heat exchanger 400. The stone guard 100 arranged upstream of the first heat exchanger 300, can comprise the second guide member in addition to the first guide member 130. The second guide member can extend adjacent the second lower end 402 of the second heat exchanger 400 and reach the third heat exchanger.

In another aspect, the second lower end 402 of the second heat exchanger 400 can be arranged higher than a third lower end of the third heat exchanger when viewed in the direction of the flow of air A. The second upper end 404 of the second heat exchanger 400 can be arranged higher than or at the same height as a third upper end of the third heat exchanger when viewed in the direction of the flow of air A.

In another aspect, the guard member 110 of the stone guard 100 can at least partially cover the third heat guard 100 can at least partially cover the third heat exchanger when viewed in the direction of the flow of air A, wherein the guard member 110 of the stone guard 100 can allow the flow of air A to reach the third heat exchanger and can block stones from hitting the third heat exchanger. In yet another aspect, the second guide member of the stone guard 100 can significantly block the space between the second heat exchanger 400 and the third heat exchanger. In yet another example, one side of the second guide member can be in contact with the second lower end 402 of the second heat exchanger 400. A free end of the second guide member can be located nearer to an upstream face of the third heat exchanger, wherein gap between the free end of the second guide member and the upstream face of the third heat exchanger is negligible. In yet another aspect, the second guide member can be configured to divide the second stream A2 of air into the third stream of air and the fourth stream of air, and guide the third stream of air and the fourth stream of air towards the second heat exchanger 400 and the third heat exchanger.

According to the above-described embodiments, the first guide member 130 of the stone guard 100 extends adjacent the first lower end 302 of the first heat exchanger 300 and reaches the second heat exchanger 400. Therefore, the first guide member 130 of the stone guard 100 significantly blocks the space between the first heat exchanger 300 and the second heat exchanger 400, and guides the flow of air A to an entire portion of the second heat exchanger 400.

Figure 6:
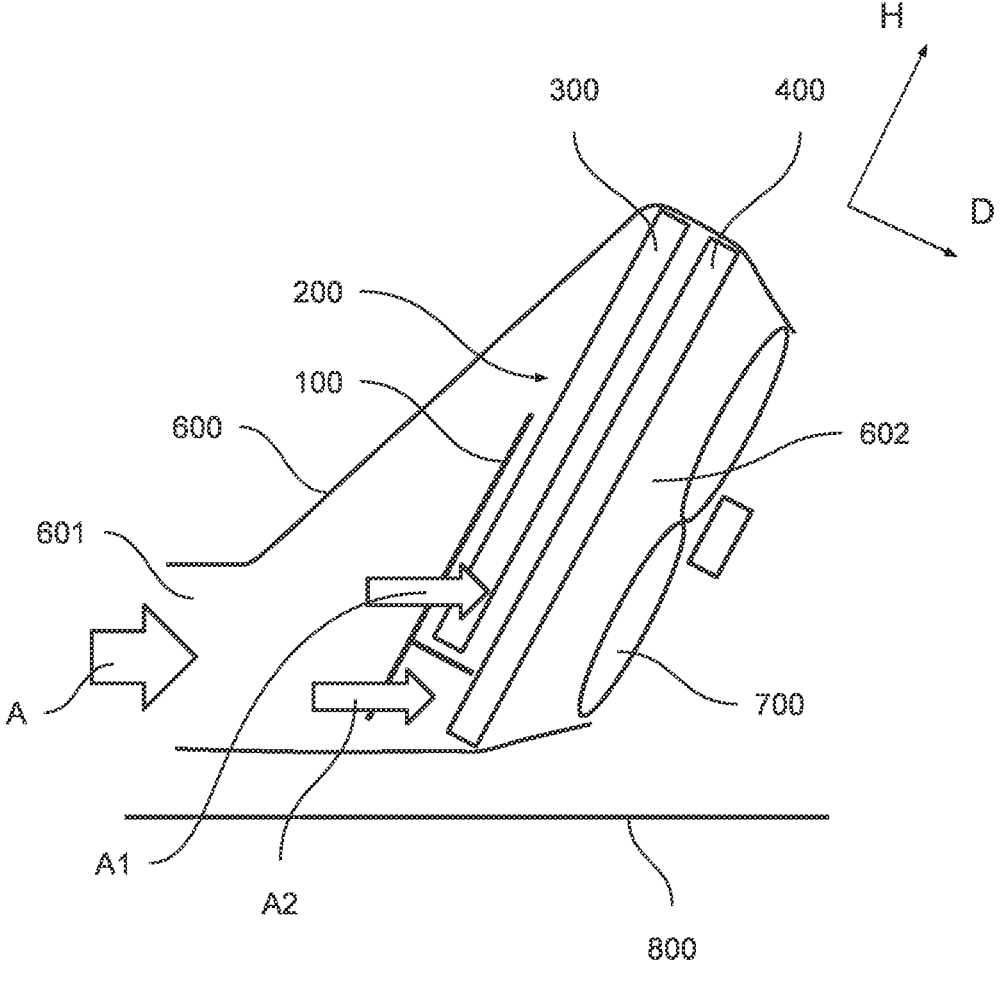
FIG. 6 shows schematically an air duct with the inclined heat exchanger module.

FIG. 6 shows schematically an air duct 600 with the inclined heat exchanger module 200. The air duct 600 includes an air inlet 601 and an air outlet 602 for the flow of the air A. The first heat exchanger 300, the second heat exchanger 400 and the stone guard 100 are arranged within the air duct 600 so the flow of the air A is enabled to enter the air duct 600 through the air inlet 601, flow through stone guard 100, the first heat exchanger 300, the second heat exchanger 400, and exit through the air outlet 602. The flow of the air A can be induced and/or supported by a fan system 700. In general, the inclined heat exchanger module 200 is inclined with respect to the ground 800. For example, the general planes of extension of the stone guard 100, the first heat exchanger 300 and the second heat exchanger 400 are inclined with respect to the ground 800. For example, the first heat exchanger 300, the second heat exchanger 400 and the stone guard 100 are stacked together and extend along a height axis, the height axis being inclined, i.e. oblique, with respect to the ground 800.

FIG. 6 indicates an example of a height axis H and a depth axis D. The first heat exchanger 300, the second heat exchanger 400 and the stone guard 100 are stacked together and extend along the height axis H so that they are each defined by a respective height dimension, and along a depth axis D so that they are each defined by a respective depth dimension. In the shown embodiment, the first heat exchanger 300 has a smaller height dimension than the second heat exchanger 400.

The height axis H can be non-parallel with respect to the flow of the air A.

The depth axis D can be parallel with respect to the flow of the air A.

The flow of the air A can be interpreted as the general direction of the flow of the air that is entering through the air inlet of the air duct 600.

All the above-described embodiments are just to explain the present invention while more embodiments and combinations thereof might exist. Hence, the present invention should not be limited to the above-described embodiments alone.

The invention claimed is:

1. A stone guard comprising:
   a guard member configured to allow airflow through the guard member and block stones from passing through the guard member; and
   a first guide member extending from the guard member, configured to divide the airflow through the guard member into a first stream of air and a second stream of air;
   the first guide member supported by at least one support member connected to the guard member and the first guide member;
   wherein the guard member includes a plurality of first members and second members, the plurality of second members connected to the plurality of first members at an oblique angle to form a plurality of openings to allow airflow through the guard member.

2. The stone guard as claimed in claim 1, wherein the guard member is of a flat quadrilateral shape with an upper end, a lower end, a first lateral end and a second lateral end.

3. The stone guard as claimed in claim 2, wherein the first guide member extends from the guard member at a right angle with the flat quadrilateral shape of the guard member.

4. The stone guard as claimed in claim 2, wherein the first guide member extends from the first lateral end to the second lateral end of the guard member.

5. An inclined heat exchanger module comprising:
   a first heat exchanger configured to exchange heat with an airflow;
   a second heat exchanger configured to exchange heat with the airflow, arranged downstream of the first heat exchanger;
   a stone guard including:
      a guard member configured to allow the airflow to pass through the guard member and block stones from passing through the guard member; and
      a first guide member extending from the guard member, configured to divide the airflow passing through the guard member into a first stream of air and a second stream of air;
   wherein the stone guard is arranged upstream of the first heat exchanger, wherein the first heat exchanger, the second heat exchanger and the stone guard are stacked together and extend along a height axis so that the first heat exchanger, second heat exchanger and the stone guard are each defined by a respective height dimension, and along a depth axis so that the first heat exchanger, second heat exchanger and the stone guard are each defined by a respective depth dimension, wherein a portion of the second heat exchanger extends beyond the first heat exchanger so that the airflow is enabled to reach the second heat exchanger without flowing through the first heat exchanger, wherein the guard member at least partially covers the first heat exchanger and partially covers the second heat exchanger, with the first guide member extending along the depth axis adjacent to the first heat exchanger so that the first stream is directed through the first heat exchanger and the second stream is directed through the second heat exchanger.

6. The inclined heat exchanger module according to claim 5, wherein the first stream is enabled to flow through a portion of the second heat exchanger covered by the first heat exchanger, while the second stream is enabled to flow through a portion of the second heat exchanger not covered by the first heat exchanger.

7. The inclined heat exchanger module according to claim 5, wherein the height dimension of the second heat exchanger is greater than the height dimension of the first heat exchanger.

8. The inclined heat exchanger module according to claim 5, wherein the first guide member extends adjacent to a portion of the first heat exchanger, extending along the depth axis.

9. The inclined heat exchanger module according to claim 5, wherein the stone guard includes at least one support member configured to support the first guide member with respect to the guard member, with the at least one support member being arranged on a side of the first guide member dedicated to the first stream.

10. The inclined heat exchanger module as claimed in claim 5, wherein the first heat exchanger is a radiator and the second heat exchanger is a condenser.

11. The inclined heat exchanger module as claimed in claim 5, further comprising an air duct with an air inlet and an air outlet for the flow of the air, with the first heat exchanger, the second heat exchanger and the stone guard being arranged within the air duct so the airflow is enabled to enter the air duct through the air inlet, flow through the stone guard, the first heat exchanger, the second heat exchanger, and exit through the air outlet.

12. A stone guard comprising:

a guard member configured to allow airflow through the guard member and block stones from passing through the guard member;

a first guide member extending obliquely and transversely from the guard member, configured to divide airflow through the guard member into a first stream of air and a second stream of air;

the first guide member supported by at least one support member connected to the guard member and the first guide member;

wherein the guard member includes a plurality of first members and second members, the plurality of second members connected to the plurality of first members at an oblique angle to form a plurality of openings to allow airflow through the guard member.

13. The stone guard as claimed in claim 12, wherein the plurality of first members are vanes.

14. The stone guard as claimed in claim 12, wherein the guard member is of a flat quadrilateral shape with an upper end, a lower end, a first lateral end and a second lateral end.

15. The stone guard as claimed in claim 12, wherein the stone guard includes a second guide member extending from the guard member, the second guide member configured to divide the second stream of air into a third stream of air and a fourth stream of air.

16. The stone guard as claimed in claim 12, wherein the plurality of first members includes a first plurality of first members arranged on one side of the first guide member and a second plurality of first members arranged on another side of the first guide member, wherein the first plurality of first members are arranged at a different angle to the plurality of second members than the second plurality of first members.

17. The stone guard as claimed in claim 12, wherein the stone guard includes a second guide member extending from the guard member, wherein the first guide member and the second guide member are located at a first distance and a second distance from an end of the guard member, respectively, and wherein the first distance is greater than the second distance.

18. The stone guard as claimed in claim 14, wherein the first guide member extends from the first lateral end to the second lateral end of the guard member.

19. The stone guard as claimed in claim 17, wherein the first guide member and the second guide member have a first height and a second height, respectively, the first height and the second height measured from respective base ends that are connected with the guard member, and wherein the second height is greater than the first height.

20. The stone guard as claimed in claim 18, wherein the plurality of first members and the plurality of second members are arranged parallel to each other.

* * * * *